US012676667B2

(12) United States Patent
Hancharik

(10) Patent No.: US 12,676,667 B2
(45) Date of Patent: Jul. 7, 2026

(54) LENSING USING LOWER EARTH ORBIT REPEATERS

(71) Applicant: Viasat Inc., Carlsbad, CA (US)

(72) Inventor: David J. Hancharik, Norcross, GA (US)

(73) Assignee: Viasat, Inc., Carlsbad, CA (US)

( * ) Notice: Subject to any disclaimer, the term of this patent is extended or adjusted under 35 U.S.C. 154(b) by 685 days.

(21) Appl. No.: 17/801,697

(22) PCT Filed: Feb. 24, 2021

(86) PCT No.: PCT/US2021/019395
§ 371 (c)(1),
(2) Date: Aug. 23, 2022

(87) PCT Pub. No.: WO2021/173654
PCT Pub. Date: Sep. 2, 2021

(65) Prior Publication Data
US 2023/0140643 A1 May 4, 2023

Related U.S. Application Data

(60) Provisional application No. 62/981,000, filed on Feb. 24, 2020.

(51) Int. Cl.
*H04B 7/185* (2006.01)

(52) U.S. Cl.
CPC ..... *H04B 7/18515* (2013.01); *H04B 7/18513* (2013.01)

(58) Field of Classification Search
CPC ............ H04B 7/18515; H04B 7/18513; H04B 7/18517; H04B 7/18521; H04B 7/195
See application file for complete search history.

(56) References Cited

U.S. PATENT DOCUMENTS

| | | | | |
|---|---|---|---|---|
| 5,920,284 A | * | 7/1999 | Victor | ....................... G01S 1/04 |
| | | | | 455/12.1 |
| 6,023,605 A | * | 2/2000 | Sasaki | .................... H04B 7/195 |
| | | | | 455/430 |

(Continued)

FOREIGN PATENT DOCUMENTS

| | | |
|---|---|---|
| CA | 3038510 A1 | 4/2018 |
| CN | 105519011 A | 4/2016 |

(Continued)

OTHER PUBLICATIONS

International Search Report and Written Opinion for PCT/US2021/019395 dated Jun. 3, 2021, 13 pages.

*Primary Examiner* — Yuwen Pan
*Assistant Examiner* — Swati Jain
(74) *Attorney, Agent, or Firm* — Holland & Hart LLP

(57) ABSTRACT

Methods, systems, and devices for communication operations are described. A first satellite may be in a first orbit, and a set of second satellites may be in second orbits that are lower than the first orbit. The second satellites may detect signal components of a signal originating from a geographic area and relay the respective signal components to the first satellite. A beamformer coupled with the first satellite may form a beam associated with the geographic area. The beamformer may also obtain a beam signal based on the respective signal components and a return channel, where the return channel includes at least a channel component between the geographic area and the set of second satellites.

23 Claims, 8 Drawing Sheets

(56)        References Cited

U.S. PATENT DOCUMENTS

| | | | | |
|---|---|---|---|---|
| 6,052,586 | A * | 4/2000 | Karabinis | H04B 7/18563 |
| | | | | 455/12.1 |
| 2001/0045494 | A1 * | 11/2001 | Higgins | B64G 1/1007 |
| | | | | 244/158.4 |
| 2010/0184427 | A1 * | 7/2010 | Zheng | H04B 7/18513 |
| | | | | 455/427 |
| 2015/0355324 | A1 * | 12/2015 | Minear | G01S 13/93 |
| | | | | 342/146 |
| 2016/0277095 | A1 * | 9/2016 | Marsh | H04B 7/18513 |
| 2016/0278064 | A1 * | 9/2016 | Marsh | H04B 7/18539 |
| 2016/0337028 | A1 * | 11/2016 | Jalali | H04B 7/18513 |
| 2018/0041270 | A1 * | 2/2018 | Buer | H04W 56/001 |
| 2018/0083741 | A1 * | 3/2018 | Motoyoshi | H04L 1/1864 |
| 2019/0109635 | A1 * | 4/2019 | Buer | H04B 7/2041 |
| 2020/0336200 | A1 * | 10/2020 | Buer | H04B 7/2041 |
| 2024/0314582 | A1 * | 9/2024 | Kong | H04B 7/06952 |

FOREIGN PATENT DOCUMENTS

| | | | | |
|---|---|---|---|---|
| CN | 107408977 | A | 11/2017 | |
| EP | 0845876 | A2 * | 6/1998 | |
| WO | WO-2017124004 | A1 * | 7/2017 | H04B 7/2041 |

* cited by examiner

200

205-1

240-1

240-P

205-S

250

500

600

645

I/O Controller

610

Transceiver

615

Antenna

625

Signal Analyzer

620

Memory

Code

635

630

Processor

640

605

Figure 7:
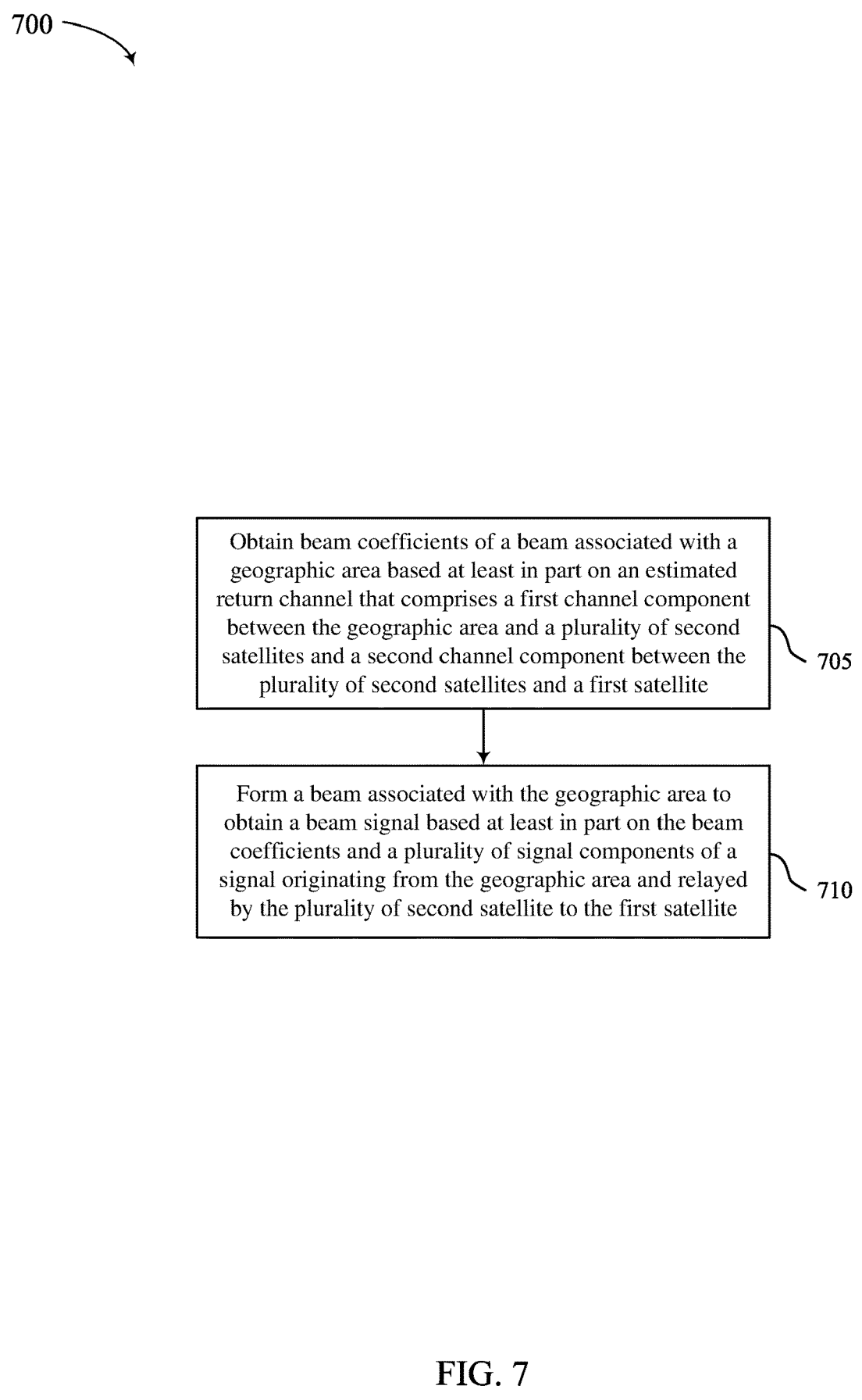

700

Obtain beam coefficients of a beam associated with a geographic area based at least in part on an estimated return channel that comprises a first channel component between the geographic area and a plurality of second satellites and a second channel component between the plurality of second satellites and a first satellite

705

Form a beam associated with the geographic area to obtain a beam signal based at least in part on the beam coefficients and a plurality of signal components of a signal originating from the geographic area and relayed by the plurality of second satellite to the first satellite

LENSING USING LOWER EARTH ORBIT REPEATERS

CROSS REFERENCE

The present Application for Patent is a 371 National Phase Application of International Patent Application No. PCT/US2021/019395 by HANCHARIK, entitled "LENSING USING LOWER EARTH ORBIT REPEATERS" filed Feb. 24, 2021, which claims the benefit of U.S. Provisional Patent Application No. 62/981,000 by HANCHARIK, entitled "LENSING USING LOWER EARTH ORBIT REPEATERS," filed Feb. 24, 2020, each of which is assigned to the assignee hereof, and each of which is expressly incorporated by reference in its entirety herein.

BACKGROUND

The following relates generally to communications and more specifically to signal detection.

An antenna array at a satellite in a geostationary orbit may illuminate a geographic area that is associated with a coverage area of the satellite. In some examples, the satellite may be used to support communications between access node terminals and user terminals in the coverage area. The satellite may also be used to detect signals emitted within a coverage area of the satellite. In some examples, the detection resolution of the satellite may be limited—e.g., due to the distance of the satellite from a target geographic area. For example, the satellite may be unable to detect signals that are transmitted or emitted within the geographic area at low power levels or not intentionally directed to the satellite.

SUMMARY

The described techniques relate to improved methods, systems, devices, and apparatuses that support lensing using lower earth orbit repeaters. A first satellite may be in a first orbit, and a set of second satellites may be in second orbits that are lower than the first orbit. The second satellites may detect signal components of a signal originating from a geographic area that is within a coverage area of the first satellite. The second satellites may relay the respective signal components to the first satellite. A beamformer coupled with the first satellite may form a beam associated with the geographic area. The beamformer may also obtain a beam signal based on the respective signal components, forming the beam, and a return channel. The return channel may at least include a channel between the geographic area and the set of second satellites.

BRIEF DESCRIPTION OF THE DRAWINGS

FIG. 7 shows a flowchart illustrating a method that supports lensing using lower earth orbit repeaters in accordance with examples as disclosed herein.

DETAILED DESCRIPTION

Figure 1A:
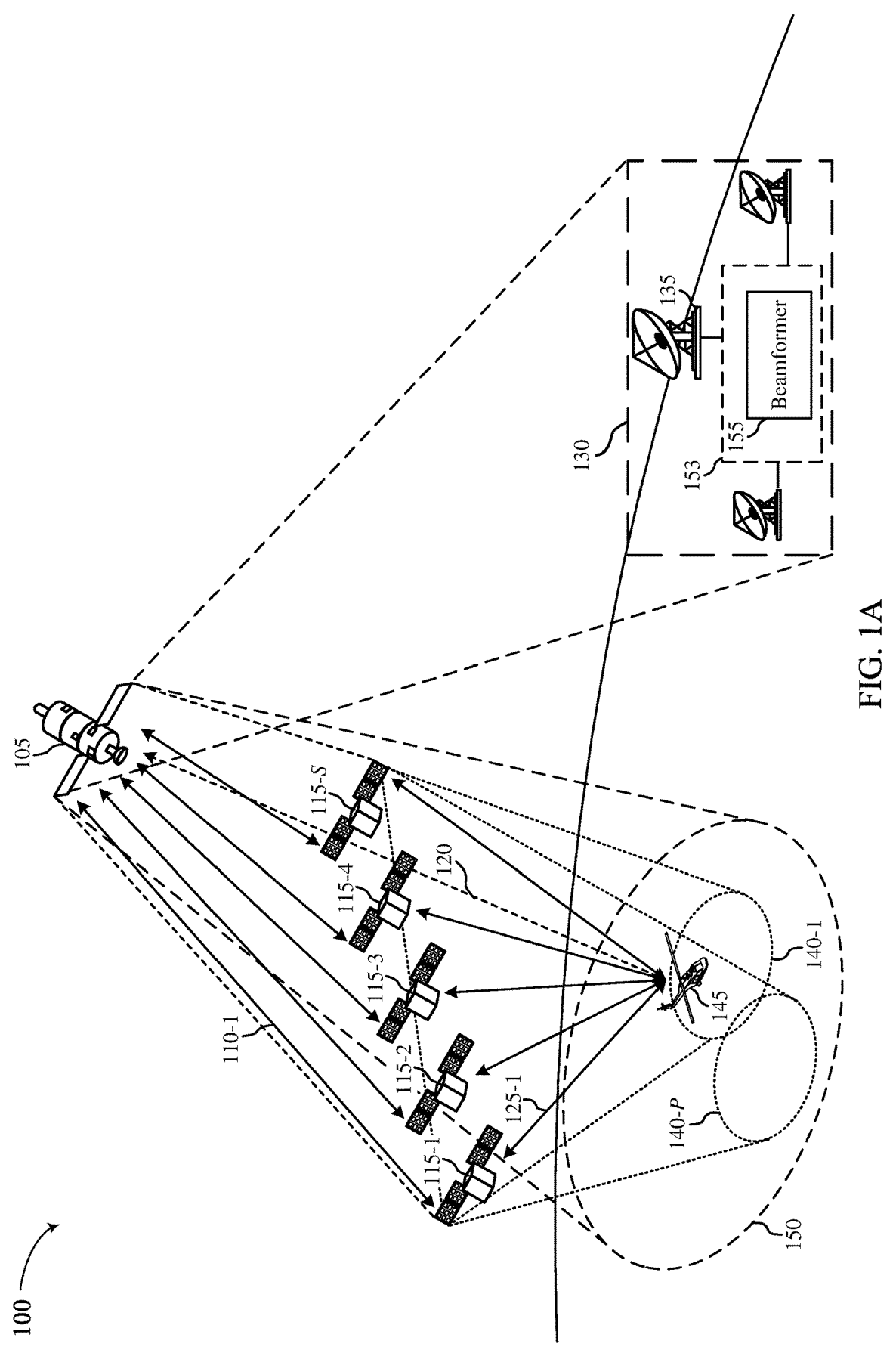
FIG. 1A shows a diagram of a communications system that supports lensing using lower earth orbit repeaters in accordance with examples as disclosed herein.

A satellite communications system may include satellites in geostationary earth orbits (GEOs), which may be referred to as GEO satellites; and satellites in non-GEO earth orbits, which may be referred to as non-GEO satellites. In some examples, the non-GEOs are lower in altitude than the GEOs. Some examples of non-GEO satellites include satellites in medium earth orbits (MEOs), which may be referred to as MEO satellites; and satellites in low earth orbits (LEDs), which may be referred to as LEO satellites. Satellites (e.g., GEO, MEO, or LEO satellites) may be used to detect signals emitted from stationary or mobile sources on land, water, or in the sky. In some examples, a satellite network operator may use the detected signals to determine whether a known or unknown emitter is in a geographic area.

A GEO satellite may be used to detect known and unknown signal emitters in a geographic area. In some examples, a resolution of the GEO satellite associated with surveying particular geographic areas may be limited based on a size of an antenna array at the GEO satellite. Thus, for a GEO satellite, a 3 dB boundary of a beam used to survey a geographic area of interest may be excessively large relative to a boundary of the geographic area of interest.

According to various aspects described herein, multiple non-GEO satellites may be used to survey a large geographic area with increased resolution—e.g., based on multiple non-GEO satellites having a larger aperture than a single satellite. In some examples, a relay link may be established between a first satellite (e.g., a GEO satellite) in a first orbit (e.g., a GEO) and one or more second satellites (e.g., non-GEO satellites) in one or more second orbits (e.g., one or more non-GEOs). The use of the one or more second satellites as relay satellites to the first satellite can allow the second satellites to be relatively low complexity (e.g., lower cost, smaller size, etc.), as compared to fully functional satellites having high-power transponders and high-gain tracking antenna systems to transmit the signals directly to ground stations. The one or more second satellites may each have one or more antennas illuminated by at least a portion of one or more geographic areas and may each detect signal components of one or more signals emitted in the one or more geographic areas. The one or more second satellites may relay the respective signal components of the one or more signals to the first satellite. In some examples, when ground-based beamforming is used, the first satellite may transmit the signal components, or representations of the signal components, to a ground system in one or more signals. In some examples, the ground system may determine and apply beamforming weights to the one or more signals received from the first satellite to obtain one or more beam signals corresponding to signals detected in the one or more geographic areas.

In other examples, when on-board beamforming is used, the first satellite may process the signal components, determining and applying beamforming weights to the signal components to obtain one or more beams signals corresponding to signals detected from the one or more geographic areas. In such cases, the first satellite may transmit representations of the one or more beam signals to the ground system. By using the signal components detected at the one or more second satellites, post-processing may be performed that enables a processing system to focus on the one or more geographic areas with enhanced sensitivity, effectively increasing a detection resolution of the first satellite.

In some examples, in addition to the respective signal components received from the one or more second satellites, the first satellite may detect an additional signal component of the one or more signals in the one or more geographic areas—e.g., via a direct path. In such cases, the second satellites may effectively increase an aperture of the first satellite. In some examples, the first satellite may transmit the additional signal component of the one or more signals, or a representation of the detected additional signal component of the one or more signals, to the ground system. The ground system may use the additional signal component to obtain the representations of the one or more signals detected in the one or more geographic areas. In other examples, the first satellite may use the additional signal component to obtain the representations of the one or more signals. By supplementing a direct signal component received at the first satellite with the signal components received at the one or more second satellites, the quality of the signal detected by the first satellite may be improved relative to if only the direct signal component is used to detect the signal (e.g., the signal strength may be increased).

Aspects of the disclosure are initially described in the context of a satellite communications system. Specific examples are then described of a coverage diagram, process flow, and constellation diagram. Aspects of the disclosure are further illustrated by and described with reference to apparatus diagrams and flowcharts that relate to lensing using lower earth orbit repeaters.

FIG. 1A shows a diagram of a communications system that supports lensing using lower earth orbit repeaters in accordance with examples as disclosed herein. Satellite communications system 100 may include a network of satellites, including first satellite 105 and second satellites 115. Satellite communications system 100 may also include a ground system 130 that includes one or more gateways 135. The one or more gateways 135 may include (or be otherwise coupled with) beamformer 155. In some examples, beamformer 155 may be included in ground station processor 153. Ground station processor 153 may use beamformer 155 to determine beam coefficients. Ground station processor 153 may also be configured to demodulate (and, in some examples, decode) beam signals generated by beamformer 155.

A satellite (e.g., first satellite 105 or a second satellite 115) may be configured to support wireless communications between one or more access node terminals (e.g., in a ground system 130) and user terminals located in a coverage area (e.g., coverage area 150). A satellite may also be configured to detect signals emitted within coverage area 150. In some examples, a satellite may include an antenna assembly having one or more antenna feed elements. Each of the antenna feed elements may also include, or be otherwise coupled with, a radio frequency (RF) signal transducer, a low noise amplifier (LNA), or power amplifier (PA), and may be coupled with one or more transponders in the satellite.

In some examples, some or all antenna feed elements at a satellite may be arranged as an array of constituent receive and/or transmit antenna feed elements that cooperate to enable various examples of beamforming, such as ground-based beamforming (GBBF), on-board beamforming (OBBF), end-to-end (E2E) beamforming, or other types of beamforming. For OBBF, the satellite may include $N_1$ transmitters and an $N_1 \times K_1$ beam weight matrix may be used to generate $K_1$ user beams. Similarly, for GBBF, the satellite may include $L_1$ transmitters and receive $L_1$ signals corresponding to respective transmitters in the satellite (e.g., frequency-division multiplexed) from one or more access node terminals. The one or more access node terminals may apply an $L_1 \times K_1$ beam weight matrix to generate $K_1$ user beams. For E2E beamforming, the satellite may include $L_1$ transponders. The $L_1$ transponders may be used to receive signals from M access node terminals, where the received signals may be weighted (e.g., weighting each of $K_1$ beam signals for respective sets of one or more access node terminals) before transmission by the access node terminals to support beamforming for $K_1$ user beams. It should be noted that the present examples describe the forward link, while similar arrangements may be made for the return link.

Satellites may be launched into different orbits—a GEO or a non-GEO orbit. A satellite in a GEO may be referred to as a GEO satellite. Non-GEO orbits may include MEOs, LEOs, equatorial low earth orbit (ELEO), and the like. A satellite in a MEO may be referred to as a MEO satellite, a satellite in a LEO may be referred to as a LEO satellite, and so on. A GEO satellite may orbit the earth at a speed that matches the rotational speed of the earth, and thus, may remain in a single location relative to a point on the earth. A LEO satellite may orbit the earth at a speed (e.g., relative to the ground) that exceeds the rotational speed of the earth, and thus, a location of the satellite relative to a point on the earth may change as the satellite travels through the LEO. LEO satellites may be launched with low inclination (e.g., ELEOs) or high inclination (e.g., polar orbits) to provide different types of coverage and revisit times for given regions of the earth. A MEO satellite may also orbit the earth at a speed that exceeds the rotational speed of the earth but may be at a higher altitude than a LEO satellite. A HEO satellite may orbit the earth in an elliptical pattern where the satellite moves closer to and farther from the earth throughout the HEO.

In some examples, GEO satellites may be more expensive and more architecturally complex (e.g., may include more repeaters, antenna elements, transponders, etc.) than non-GEO satellites. Despite the increased complexity of GEO satellites, networks of non-GEO satellites may be capable of providing services and surveilling the earth with more granularity than GEO satellites (e.g., based on being more numerous and closer to the earth). In some examples, GEO satellites and non-GEO satellites operate independently of one another. In some examples, first satellite 105 may be a GEO satellite. Second satellites 115 may include LEO satellites, MEO satellites, or a combination thereof.

In some examples, a satellite network may be used to surveil at least a portion of the earth for signals emitted from known and unknown transmitters. For example, a satellite network may use first satellite 105 to detect signals that originate from a geographic area (e.g., the geographic area encompassed by coverage area 150). In some examples, first satellite 105 may transmit detected signal energy to a ground system 130 (e.g., to one or more of gateways 135) that processes (e.g., determine and apply beamforming coefficients to) the detected signal energy to obtain one or more signals—e.g., when ground-based beamforming is used. In other examples, first satellite 105 may process (e.g., determine and apply beamforming coefficients to) the detected signal energy and transmit the one or more signals to the ground system 130—e.g., when on-board beamforming is used.

A GEO satellite may be used to detect known and unknown signal emitters in a geographic area. In some examples, a resolution of the GEO satellite associated with surveying particular geographic areas may be limited based on a size of an antenna array at the GEO satellite and a distance of the GEO satellite from a point of interest. Thus, for a GEO satellite, a 3 dB boundary of a beam used to survey a geographic area of interest may be excessively large relative to a boundary of the geographic area of interest.

According to various aspects described herein, multiple non-GEO satellites may be used to survey a large geographic area with increased resolution—e.g., based on multiple non-GEO satellites having a larger aperture than a single satellite (e.g., a GEO, MEO, or LEO satellite). In some examples, a relay link may be established between a first satellite 105 (e.g., a GEO satellite) in a first orbit (e.g., a GEO) and one or more second satellites 115 (e.g., non-GEO satellites) in one or more second orbits (e.g., one or more non-GEOs). The one or more second satellites 115 may each have one or more antennas illuminating at least a portion of one or more geographic areas 140 and may each detect signal components 125 of one or more signals emitted in the one or more geographic areas. According to various aspects described herein, the one or more antennas of the second satellites 115 are described as being illuminated by (instead of illuminating) the portion of the one or more geographic areas 140. It is worth noting that these terms may be used interchangeably to describe that the one or more antennas of the second satellites 115 may be used to transmit signals to or detect signals from the one or more geographic areas 140.

The one or more second satellites 115 may relay the respective signal components 125 of the one or more signals to the first satellite 105. In some examples, when ground-based beamforming is used, the first satellite 105 may transmit the signal components, or representations of the signal components, in one or more signals to ground system 130. In some examples, the ground system 130 may determine and apply beamforming weights to the one or more signals received from the first satellite 105 to obtain one or more beam signals corresponding to the one or more signals detected in the one or more geographic areas 140.

In other examples, when on-board beamforming is used, the first satellite 105 may process the relayed signal components 110, determining and applying beamforming weights to the signal components to obtain one or more beam signals corresponding to the one or more signals. In such cases, the first satellite 105 may transmit representations of the one or more beam signal signals to ground system 130. By using the signal components detected at the one or more second satellites 115, post-processing may be performed that enables a processing system to focus on the one or more geographic areas 140 with enhanced sensitivity, effectively increasing a detection resolution of the first satellite 105.

In some examples, in addition to the respective signal components relayed from the one or more second satellites 115, the first satellite 105 may detect an additional signal component (e.g., direct signal component 120) of the one or more signals in the one or more geographic area—e.g., via a direct path. In such cases, the second satellites may effectively increase an aperture of the first satellite. In some examples, the first satellite 105 may use the additional signal component to obtain the representations of the one or more signals. In other examples, the first satellite 105 may transmit the additional signal component of the one or more signals, or a representation of the detected additional signal component of the one or more signals, to the ground system 130. The ground system 130 may use the additional signal component to obtain the representations of the one or more signals detected in the one or more geographic areas 140. By supplementing a direct signal component 120 received at the first satellite 105 with the signal components received at the one or more second satellites 115, the quality of the signal detected by the first satellite 105 may be improved relative to if only the direct signal component 120 is used to detect the signal (e.g., the signal strength may be increased).

As RF signal energy radiates from an emitter (e.g., a transmitter or thermal energy emitter), each second satellite 115 detects components (e.g., having respective phase shifts or amplitude variations due to different channels between the emitter and the respective second satellite 115) of the signal. When used in combination with first satellite 105 to detect signal components in geographic areas 140 corresponding to a location of an emitter (e.g., emitter 145), the second satellites 115 may be referred to as relay satellites 115. The geographic areas 140 may be positioned within coverage area 150 of first satellite 105. For example, first relay satellite 115-1 may receive first detected signal component 125-1 based on a signal emitted from emitter 145 within first geographic area 140-1. In some examples, first relay satellite 115-1 receives first detected signal component 125-1 via a first return channel (which may be referred to as $A_{TL_1}$), second relay satellite 115-2 receives a second detected signal component via a second return channel (which may be referred to as $A_{TL_2}$), and so on. In some examples, the return channels between the relay satellites 115 and first geographic area 140-1 may be included in a combined return channel matrix (which may be referred to as $A1_{RTN}$). Relay satellites 115 may similarly receive signal components detected from other geographic areas 140 (including Pth geographic area 140-P).

In some examples, return channels between relay satellite 115 and a set of geographic areas 140 may be included in the combined return channel matrix $A1_{RTN}$. The matrix $A1_{RTN}$ may include a quantity of rows that is based on a quantity of repeaters included in the relay satellites 115 and a quantity of the relay satellites 115, and a quantity of columns that is based on a quantity of geographic areas 140 monitored by the relay satellites 115. For example, if S relay satellites 115 include Q repeaters and are used to monitor P geographic areas 140, the $A1_{RTN}$ matrix may have Q S rows and P columns.

The relay satellites 115 may relay the detected signal components 125 (or representations of the detected signal components) to first satellite 105. In some examples, relaying the detected signal components 125 involves frequency-shifting the detected signal component, amplifying the detected signal components, or both, before the detected signal components are relayed to first satellite 105.

Figure 1B:
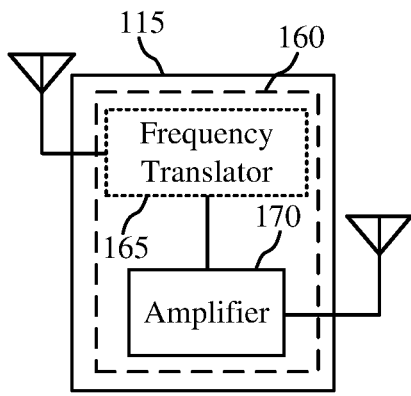
FIG. 1B shows components of satellites that support lensing using lower earth orbit repeaters in accordance with examples as disclosed herein.

FIG. 1B shows components of satellites that support lensing using lower earth orbit repeaters in accordance with examples as disclosed herein. As depicted in FIG. 1B, a relay satellite 115 may include one or more repeaters 160 that are used to amplify and/or frequency shift a detected signal before relaying the detected signal to first satellite 105. A repeater 160 may be a non-processing repeater. That is, the repeater 160 may perform operations that interpret or re-format data within the signal waveform. For example, the repeater 160 may not digitize, demodulate, decode, apply beamforming weights, or reformat the detected signals before relaying the detected signals to first satellite 105. A repeater 160 may include frequency translator 165, amplifier 170, or both. Frequency translator 165 may be configured to shift a frequency of a detected signal (e.g., by mixing the detected signal with another frequency). In some examples, the frequency translators 165 in different relay satellites 115 may be configured to apply different frequency shifts to detected signals. Amplifier 170 may be configured to amplify a detected signal before relaying the amplified signal to first satellite 105.

In some examples, first relay satellite 115-1 may send first relayed signal component 110-1 (which may correspond to an amplified version of first detected signal component 125-1) to first satellite 105. In some examples, first relay satellite 115-1 transmits first relayed signal component 110-1 to first satellite 105 via a first return channel (which may be referred to as $A_{LG_1}$), second relay satellite 115-2 transmits a second transmitted signal component via a second return channel (which may be referred to as $A_{LG_2}$), and so on. The return channels between the relay satellites 115 and first satellite 105 may be included in a second combined return channel matrix (which may be referred to as $A2_{RTN}$). The relay satellites 115 may similarly transmit signal components detected from other geographic areas 140 (including Pth geographic area 140-P) via the second combined return channel $A2_{RTN}$.

The matrix $A2_{RTN}$ may include a quantity of rows that is based on a quantity of uplink/downlink transponder paths at first satellite 105, and a quantity of columns that is based on a quantity of relay satellites 115 and a quantity of repeaters included in the relay satellites 115. For example, if first satellite 105 includes L uplink/downlink transponder paths and there are S relay satellites 115 with Q repeaters, the $A2_{RTN}$ matrix may have L rows and Q·S columns.

Thus, the return channel between the geographic areas 140 and first satellite 105 may be a composite return channel that includes multiple components—a first channel component between the relay satellites 115 and the geographic areas 140 (which may be represented by $A1_{RTN}$) and a second channel component between the relay satellites 115 and first satellite 105 (which may be represented by $A2_{RTN}$). In some examples, the composite return channel between the geographic areas 140 and first satellite 105 may be represented by an $A2_{RTN}A1_{RTN}$ matrix. In some examples, if first satellite 105 includes L uplink/downlink transponder paths and P geographic areas 140 are monitored, the $A2_{RTN}A1_{RTN}$ matrix may have L rows and P columns.

In some examples, first satellite 105 may receive direct signal components from one or more of the geographic areas 140. For example, first satellite 105 may receive direct signal component 120 from emitter 145 via a direct return channel (which may be represented as $A_{TG}$) between first satellite 105 and first geographic area 140-1. In some examples, the return channels between the geographic areas 140, relay satellites 115, and first satellite 105 may be combined with the direct return channel to form a composite return channel matrix (which may be represented as $A_{RTN}$), where $$A_{RTN} = A_{TG} + \sum_{s=0}^{S} A_{TL_s} A_{LG_s}.$$

The matrix $A_{RTN}$ may include a quantity of rows that is based on a quantity of uplink/downlink transponder paths included in first satellite 105, and a quantity of columns that is based on a quantity of geographic areas 140 monitored by the relay satellites 115. For example, if first satellite 105 includes L uplink/downlink transponder paths and is used to monitor P geographic areas 140, $A_{RTN}$ may have L rows and P columns.

Similarly, a full return channel between the geographic areas 140 and ground system 130 may be a composite return channel that includes multiple components. In some examples, the full return channel includes the channel component between the geographic areas 140 and first satellite 105 (which may be represented by $A2_{RTN}A1_{RTN}$ or $A_{RTN}$); a channel component within first satellite 105 between the uplink and downlink transponders on first satellite 105 (which may be represented by a matrix $E_{RTN}$); and a channel component between first satellite 105 and ground system 130 (which may be represented by a matrix $C_{RTN}$).

As depicted in FIG. 1B, first satellite 105 may include one or more transponders 175 that are used to amplify and/or frequency shift a detected signal before transmitting a received signal to first satellite 105. A transponder 175 may include frequency translator 165, amplifier 170, or both. Frequency translator 180 may be configured to shift a frequency of a received signal (e.g., by mixing the detected signal with another frequency). Amplifier 185 may be configured to amplify a received signal before transmitting the amplified signal to ground system 130. In some examples, the transponder 175 may be coupled with on-board processing components, such as beamformer 190, a demodulator, a decoder, a reformatting component, or a combination thereof. In some examples, the on-board processing components may be included in an on-board processor 187. In some examples, when beamformer 190 is included in first satellite 105, ground system 130 may not use beamformer 155 to process signals received from first satellite 105.

In some examples, the channel component within first satellite 105 is based on paths through transponders in first satellite 105, where the matrix $E_{RTN}$ may include a quantity of rows and columns that are based on a quantity of transponders included in first satellite 105. For example, if first satellite 105 includes L transponders, the $E_{RTN}$ matrix may include L rows and L columns.

Also, the channel component between first satellite 105 and ground system 130 (represented by the $C_{RTN}$ matrix) may be based on a quantity of ground stations included in ground system 130 and a quantity of repeaters included in first satellite 105. For example, if ground system includes M ground stations (e.g., gateways) and first satellite 105 includes L uplink/downlink transponder paths, the $C_{RTN}$ matrix may include M rows and L columns.

In some examples, the full return channel between the geographic areas 140 and ground system 130 may be represented by a matrix $H_{RTN}$, where $H_{RTN} = C_{RTN}E_{RTN}A2_{RTN}A1_{RTN}$ In some examples, if ground system 130 includes M ground stations and P geographic areas 140 are monitored, the $H_{RTN}$ matrix may have M rows and P columns.

In some examples, ground system 130 may estimate the full return channel $H_{RTN}$ based on signals received from known emitters positioned within coverage area 150. Ground system 130 may use the signals received from the known emitters to determine return channels associated with the received signals and may interpolate the determined return channels to estimate the return channels between geographic areas 140 and ground system 130. In some examples, ground system 130 may use the received signals to estimate a portion of the full return channel components. For example, ground system 130 may use the signals to estimate the channel component associated with $A1_{RTN}$, where the other channel components may be estimated based on reference signals communicated between devices to support channel estimation.

Ground system 130 may use the estimated channel components to determine return covariance (which may be represented by the matrix $R_{RTN}$). In some examples, the ground system may use the estimated channel component to determine a return covariance between signals received from different geographic areas 140 at M different ground stations, where $$R_{RTN} = 2\sigma_{dl}^2 I_m + 2\sigma_{ul}^2 C_{RTN} E_{RTN} E_{RTN}{}^H C_{RTN}{}^H + H_{RTN} H_{RTN}{}^H,$$

where $$\sigma_{dl}^2$$

is a noise term associated with a downlink (which may also be referred to as a forward link);

$$\sigma_{ul}^2$$

is a noise term associated with an uplink (which may also be referred to as a reverse link); and $I_m$ is an M×M identity matrix. In some examples, the return covariance may also include covariance caused by interfering user traffic (e.g., for J interferers). In such cases, $$R'_{RTN} = R_{RTN} + 2\sigma_{ul-J}^2 C_{RTN} E_{RTN} J_{RTN} J_{RTN}{}^H E_{RTN}{}^H C_{RTN}{}^H,$$

where $J_{RTN}$ may be the channel between the interferers and the ground system. Both of the $R_{RTN}$ and $$R'_{RTN}$$

matrices may have M rows and M columns.

Ground system 130 may use the estimated full return channel and estimated return covariance to determine beam coefficients to apply to signals received over the full return channel. In some examples, the beam coefficients are represented by the matrix $B_{RTN}$, where $B_{RTN}=(R_{RTN}{}^{-1}H_{RTN})^H$. The matrix $B_{RTN}$ may include a quantity of rows that is based on a quantity of monitored geographic areas 140 and a quantity of columns based on a quantity of ground stations in a ground system 130. For example, for P geographic areas and M ground stations, the matrix $B_{RTN}$ may include P rows and M columns. Thus, the beamformed channel between the ground system 130 and the one or more geographic areas 140 may be represented as $H_{RTN-BF}$, where $H_{RTN-BF}=B_{RTN}H_{RTN}=B_{RTN}C_{RTN}E_{RTN}A_{RTN}$.

In some examples, instead of applying the beam coefficients to signals received at ground system 130, first satellite 105 may apply similarly determined beam coefficients to signals received from relay satellites 115. In such examples, first satellite 105 may transmit a composite signal to ground system 130 that includes a representation of signals detected in each monitored geographic area 140. When the beamforming is performed at first satellite 105, the $C_{RTN}$ matrix may be an identity matrix (e.g., an M×L identity matrix, where M may equal 1).

In some examples, instead of transmitting the signal components detected at relay satellites 115 to first satellite 105, relay satellites 115 may transmit the detected signal components directly to ground system 130. In addition to the signal components transmitted to ground system 130, first satellite 105 may transmit a direct signal component to ground system 130. In such cases, the signal components of a signal detected at relay satellites 115 may supplement the direct signal component of the signal detected by first satellite 105.

Although generally described with reference to detecting signals originating from geographic areas 140 within coverage area 150, similar techniques may be used to transmit signals to user terminals with geographic areas 140 on a forward link. In such cases, forward channels between ground system 130 and geographic areas 140 may similarly include multiple channel components, including a channel component between ground system 130 and first satellite 105, a channel component between first satellite 105 and relay satellites 115, and a channel component between relay satellites 115 and the geographic areas 140. In such cases, ground system 130 may similarly estimate the forward channels (and, in some examples, individually estimate one or more of the forward channel components). Also, ground system 130 may determine and apply beam coefficients to signals to be transmitted in the different geographic areas— e.g., applying a first set of beam coefficients to a first signal to cause relay satellites 115 to focus a transmission of the first signal within first geographic area 140-1, a second set of beam coefficients to a second signal to cause relay satellite 115 to focus a transmission of the second signal within a second geographic area, and so on. In such examples, first satellite 105 may transmit different components of a signal to the relay satellites 115, and the relay satellites 115 may transmit the different signal components, the different signal components coherently combining within a desired geographic area 140. In some examples, relay satellites 115 may reduce a transmission power of the different signal components to comply with signal strength thresholds on earth (e.g., as set by a regulatory agency).

Figure 1B:
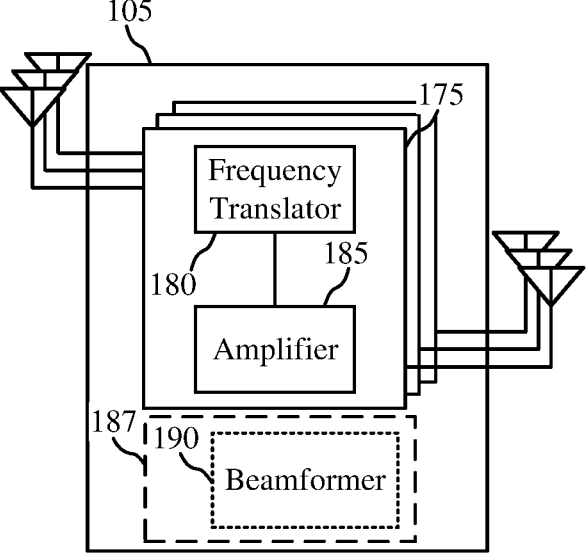
Figure 2:
FIG. 2 shows an example of a coverage diagram that supports lensing using lower earth orbit repeaters in accordance with examples as disclosed herein.

FIG. 2 shows an example of a coverage diagram that supports lensing using lower earth orbit repeaters in accordance with examples as disclosed herein. Coverage diagram 200 depicts a coverage area of a first satellite (e.g., a GEO satellite, a first satellite 105 of FIG. 1) and a GEO satellite that uses one or more second satellites (e.g., LEO satellites, MEO satellites, LEO and MEO satellites, relay satellites 115 of FIG. 1) to focus on a geographic area.

In some examples, an antenna array at a first satellite is associated with coverage area 250. The boundary of coverage area 250 may represent points from which signals received at the antenna array have a signal strength that is at a 3 dB point. In some cases, coverage area 250 may represent the coverage area for a beamformed beam for transmission or reception from coverage area 250 via the first satellite. In some examples, the first satellite may be capable of processing signals received from within coverage area 250. However, with regard to detecting signals within coverage area 250, the first satellite may be unable to determine where within coverage area 250 the signal originated. As described herein to increase a detection resolution (and, in some examples, to effectively increase an aperture) of a first satellite, one or more second satellites (that orbit lower than the first satellite) may be used to detect signals originating from geographic regions within coverage area 250.

In some examples, each of the second satellites may have a smaller coverage area 205 relative to the first satellite. Like coverage area 250, the boundaries of coverage areas 205 may represent a 3 dB point for detecting signals originating from within coverage areas 205. For first focused coverage area 205-1, for example, the corresponding second satellite may be capable of detecting signals originating from a geographic region corresponding to first focused coverage area 205-1, but not signals originating from within coverage area 250 but outside of first focused coverage area 205-1. In some examples, energy from within overlapping coverage areas 205 of the second satellites may be combined to focus on particular geographic areas 240. For example, the second satellites may be used to focus on first geographic area 240-1.

In some examples, the second satellites may be used to focus (e.g., simultaneously) on multiple geographic areas 240 within coverage area 250 for the detection of signals. For example, in addition to focusing on first geographic area 240-1, the second satellites may be used to focus on other geographic areas (e.g., first geographic area 240-1, Pth geographic area 240-P). The different geographic areas 240 monitored using the second satellites may be non-overlapping or overlapping. In some examples, the second satellites may similarly be used to focus on one or more geographic areas within coverage area 250 for the transmission of signals to user devices within the one or more geographic areas.

Figure 3:
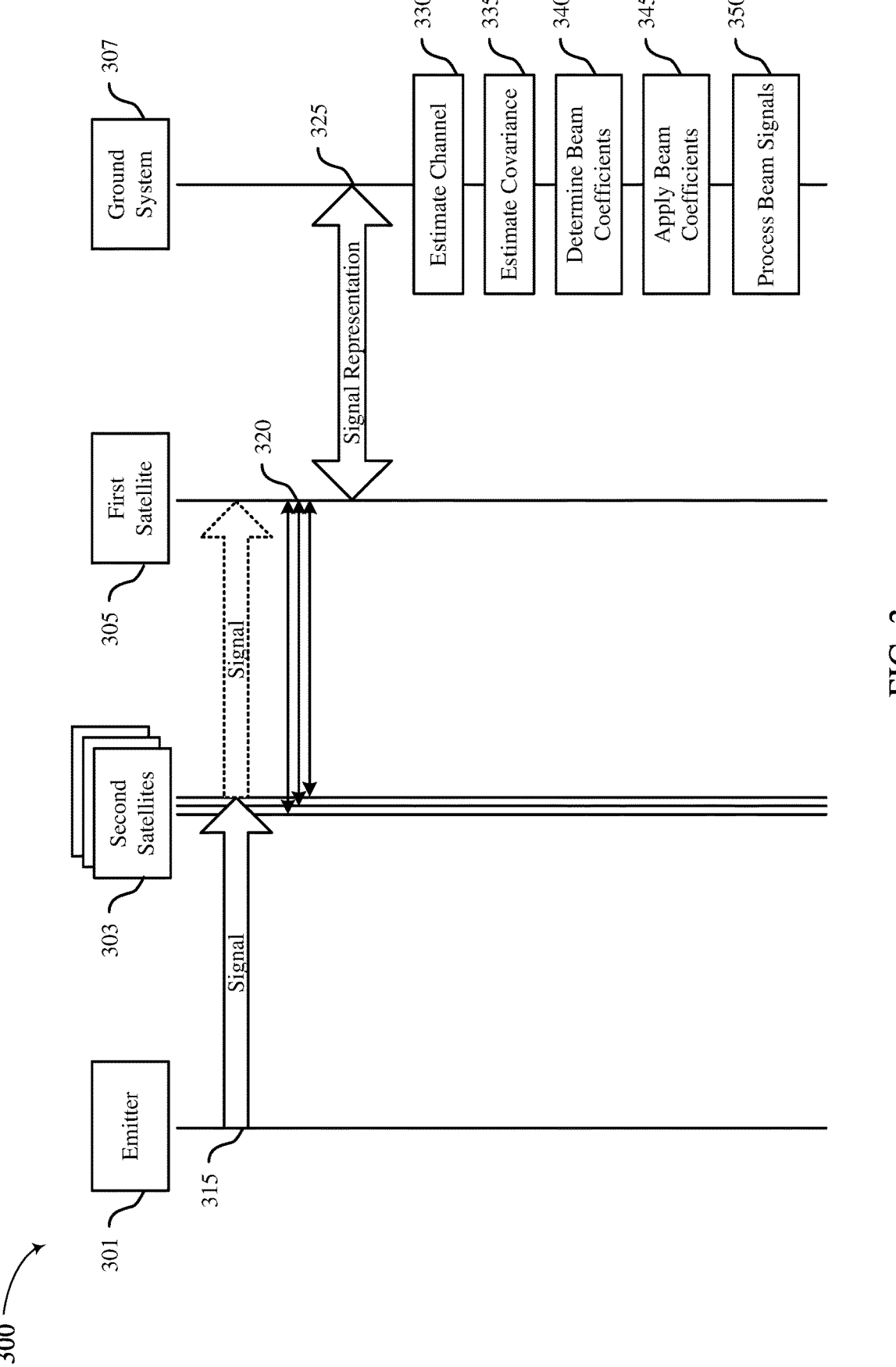
FIG. 3 shows an exemplary set of operations that support lensing using lower earth orbit repeaters in accordance with examples as disclosed herein.

FIG. 3 shows an exemplary set of operations that support lensing using lower earth orbit repeaters in accordance with examples as disclosed herein. Process flow 300 may be performed by second satellites 303, first satellite 305, and ground system 307, which may be examples of second satellites 115, first satellite 105, and ground system 130 as described in FIG. 1. In some examples, process flow 300 illustrates an exemplary sequence of operations performed to support using lower earth orbit repeaters. For example, process flow 300 depicts operations for detecting signals transmitted in geographic areas within a coverage area of a GEO satellite.

It is understood that one or more of the operations described in process flow 300 may be performed earlier or later in the process, omitted, replaced, supplemented, or combined with another operation. Also, additional operations described herein that are not included in process flow 300 may be included.

At arrow 315, emitter 301 may emit a signal while positioned within a geographic area. In some examples, emitter 301 emits the signal while wirelessly communicating with another device that is not second satellites 303 or first satellite 305. In other examples, emitter 301 involuntarily emits the signal (e.g., emitter 301 may be a rocket, and the signal may be associated with a flare produced by the rocket). One or more of second satellites 303 may detect the signal. That is, the signal may radiate from the emitter 301 and each of the second satellites 303 may detect a different signal component associated with the emitted signal. In some examples, in addition to being detected at second satellites 303, a direct signal component of the emitted signal may be detected at first satellite 305.

At arrows 320, second satellites 303 may relay the detected signal components (or representations of the received signal components) to first satellite 305. In some examples, second satellites 303 may apply the detected signal components to one or more repeaters that are used to relay the detected signal components to first satellite 305. A repeater may be used to amplify, apply a frequency shift to, or apply a phase shift to a detected signal component (or a combination thereof) before transmission to first satellite 305. In some examples, first satellite 305 may receive the signal components at one or more antenna elements. First satellite 305 may also receive the direct signal component at one or more antenna elements.

At arrow 325, first satellite 305 may transmit a representation of the signal emitted by emitter 301 to ground system 307. First satellite 305 may transmit the signal components (in some examples, including the direct signal component) to ground system 307. In some examples, first satellite 305 transmits the signal components to ground system 307 in one or more beams to one or more ground stations. Ground system 307 may receive the signal transmitted from first satellite 305. In some examples, ground system 307 may receive the signal transmitted from first satellite 305 at one or more ground stations.

At block 330, ground system 307 may estimate a channel (which may be referred to as a return channel and represented by $H_{RTN}$) between ground system 307 and emitter 301 based on the received signals. In some examples, ground system 307 may also estimate the channel based on signals received from known transmitters located within or around a geographic area (e.g., a geographic area 140 in FIG. 1 or a geographic area 240 in FIG. 2) that includes emitter 301. In some examples, the signals received from the known transmitters may be transmitted concurrently with the signals detected by second satellites 303. In some examples, the signals received from the known transmitters may be transmitted before the signals are detected by second satellites 303—in some cases, the signals may be received by a different set of second satellites than second satellites 303. That is, a channel estimation for relay by a given set of second satellites may be made using information of signals from known transmitters relayed by a different (e.g., non-overlapping, partially overlapping) set of second satellites.

In some examples, to estimate the return channel, ground system 307 may estimate a portion of the return channel between emitter 301 and second satellites 303 (which may be represented by $A1_{RTN}$), a portion of the return channel between second satellites 303 and first satellite 305 (which may be represented by $A2_{RTN}$), a portion of the return channel between uplink and downlink transponders within first satellite 305 (which may be represented by $E_{RTN}$), and a portion of the return channel between first satellite 305 and ground system 307 (which may be represented by $C_{RTN}$). When first satellite also receives a direct signal component, ground system may estimate a portion of the return channel between emitter 301 and first satellite 305 (which may be represented by $A_{RTN}$).

In some examples, ground system 307 estimates the channel between emitter and second satellites 303 ($A1_{RTN}$) based on interpolating signals transmitted by known transmitters within a vicinity of a set of monitored geographic areas. And estimates the channel (e.g., $A2_{RTN}$, $E_{RTN}$, and $C_{RTN}$ between second satellites 303 and ground system 307 based on reference signals transmitted from known transmitters in the set of monitored geographic areas. In other examples, the components of the channel are estimated individually. For example, the channel between second satellites 303 and first satellite 305 ($A2_{RTN}$) may be estimated (e.g., by first satellite 305) based on reference signals transmitted between second satellites 303 and first satellite 305. The return channel of the transponders of the first satellite ($E_{RTN}$) may also be estimated by first satellite 305. First satellite 305 may indicate the estimated channels to ground system 307. And the channel between first satellite 305 and ground system 307 ($C_{RTN}$) may be estimated (e.g., by ground system 307) based on reference signals transmitted between first satellite 305 and ground system 307.

At block 335, ground system 307 may estimate covariance associated with the return channel—e.g., based on the estimated return channel/components of the estimated return channel. The covariance may provide information regarding interference between transmissions of signal components detected in different geographic areas to ground system 307 and interference from other communications with ground system 307. In some examples, the interference between signals components from different geographic areas may be represented by $$R_{RTN} = 2\sigma_{di}^2 I_m + 2\sigma_{ui}^2 C_{RTN} E_{RTN} E_{RTN}{}^H C_{RTN}{}^H + H_{RTN} H_{RTN}{}^H.$$

Also, the interference between J users may be represented by $$R_{RTN-int} = 2\sigma_{ul-J}^2 C_{RTN} E_{RTN} J_{RTN} J_{RTN}{}^H E_{RTN}{}^H + C_{RTN}{}^H.$$

And the combined covariance may be represented by $$R'_{RTN} = R_{RTN} + R_{RTN-int}.$$

At block 340, ground system 307 may use the estimated return channel and the estimated return covariance to determine beam coefficients to apply to signals received from first satellite 305. In some examples, the beam coefficients may be represented by the matrix $B_{RTN}$, where $B_{RTN}$ where equal $(R_{RTN}{}^{-1} H_{RTN})^H$. In some examples, the beam coefficients and the return channel are determined based on a same time period, where the signals received to estimate the channel may also be used to determine the beam coefficients. In some examples, ground system 307 may constantly (e.g., every millisecond) update the estimated return channel and beam coefficients based on received signals. For example, the ground system 307 may process a first set of signals to estimate the return channel and reprocess the first set of signals to determine the beam coefficients based on the estimated return channel.

At block 345, ground system 307 may apply beam coefficients to the signal received from first satellite 305 to obtain one or more beam signals corresponding to one or more geographic areas. In some examples, the one or more beam signals correspond to representations of one or more signals emitted in the geographic areas. The one or more beam signals may include a beam signal that is a representation of the signal emitted by emitter 301 in a geographic area. In some examples, when digital beamforming is used, applying the beam coefficients may include applying beam coefficients to a digital representation of the signal—e.g., by multiplying a beam coefficient matrix with a matrix representing the signal. In other examples, applying the beam coefficients may include combining components of the analog signal received at ground system 307 to obtain an analog beam signal.

At block 350, ground system 307 may process (e.g., filter, analyze, demodulate, decode) the one or more beam signals to determine whether a signal has been detected in a geographic area of interest. In some examples, ground system 307 determines a type of signal (e.g., a communication signal, a signal associated with a rocket, etc.) that has been detected in a geographic area of interest.

As suggested above, an order of the operations of process flow 300 may be changed. In some examples, the operations for estimating a return channel and covariance associated with the return channel and determining beam coefficients may be performed by ground system 307 before the representation of the signal emitted by emitter 301 is received from first satellite 305.

In some examples, operations of process flow 300 may be performed by different devices. For example, the operations for estimating a return channel and covariance associated with the return channel; determining beam coefficients; and applying beam coefficients may be performed by first satellite 305 (e.g., if first satellite is configured to perform OBBF). In such cases, first satellite 305 may transmit one or more beam signals corresponding to the signal emitted by emitter 301 to ground system 307. And ground system 307 may process the received one or more beam signals as described herein.

Although described in the context of using second satellites 303 to detect signals via return channels associated with geographic areas within a coverage area of first satellite 305, similar operations may be performed to estimate forward channels associated with the geographic areas and to use second satellites 303 to relay signals to user devices within the geographic areas.

Figure 4:
FIG. 4 shows an example of a constellation diagram that supports lensing using lower earth orbit repeaters in accordance with examples as disclosed herein.
Figure 4:
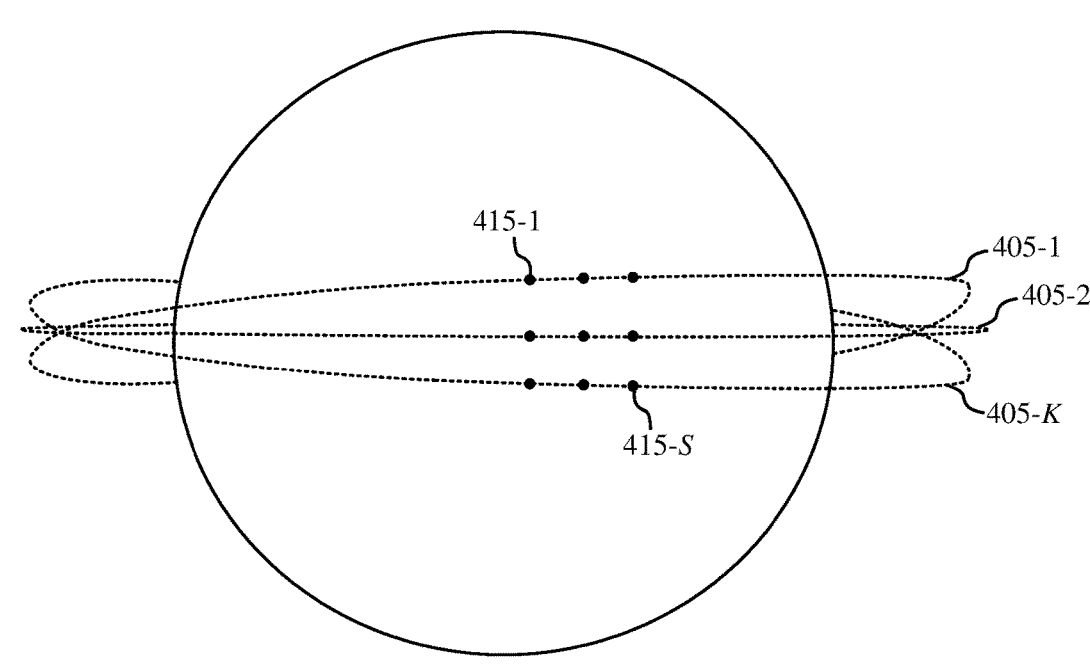

FIG. 4 shows an example of a constellation diagram that supports lensing using lower earth orbit repeaters in accordance with examples as disclosed herein. Constellation diagram 400 depicts a set of second satellites (e.g., LEO satellites, MEO satellites, relay satellites 115 of FIG. 1, etc.) that may be used in combination with a first satellite (e.g., a GEO satellite, first satellite 105 of FIG. 1, etc.) to increase a detection resolution (and, in some examples, to effectively increase an aperture) of the first satellite for detecting signals within a coverage area. In some examples, the coverage areas of the second satellites 415 may correspond to respective focused coverage areas 205 described in FIG. 2.

Constellation diagram 400 may include S second satellites 415, where S may equal nine. Sets of the second satellites 415 may be positioned in different orbital planes 405 (e.g., in K orbital planes). In some examples, the second satellites 415 are distributed amongst three orbital planes 405, where first orbital plane 405-1 may have a negative five (−5) degree inclination, second orbital plane 405-2 may have a zero (0)

degree inclination, and third orbital plane 405-3 may have a five (5) degree inclination. In some examples, the second satellites 415 may be evenly distributed amongst the three orbital planes 405, such that three of the second satellites 415 are included in each of the orbital planes. In some examples, the second satellites 415 included in a same orbital plane 405 may be separated from one another based on a degree of separation. For example, a degree of separation between the second satellites 415 included in a same orbital plane 405 may be equal to (or around) five (5) degrees.

Figure 5:
FIG. 5 shows a block diagram of a signal analyzer that supports lensing using lower earth orbit repeaters in accordance with examples as disclosed herein.
Figure 5:
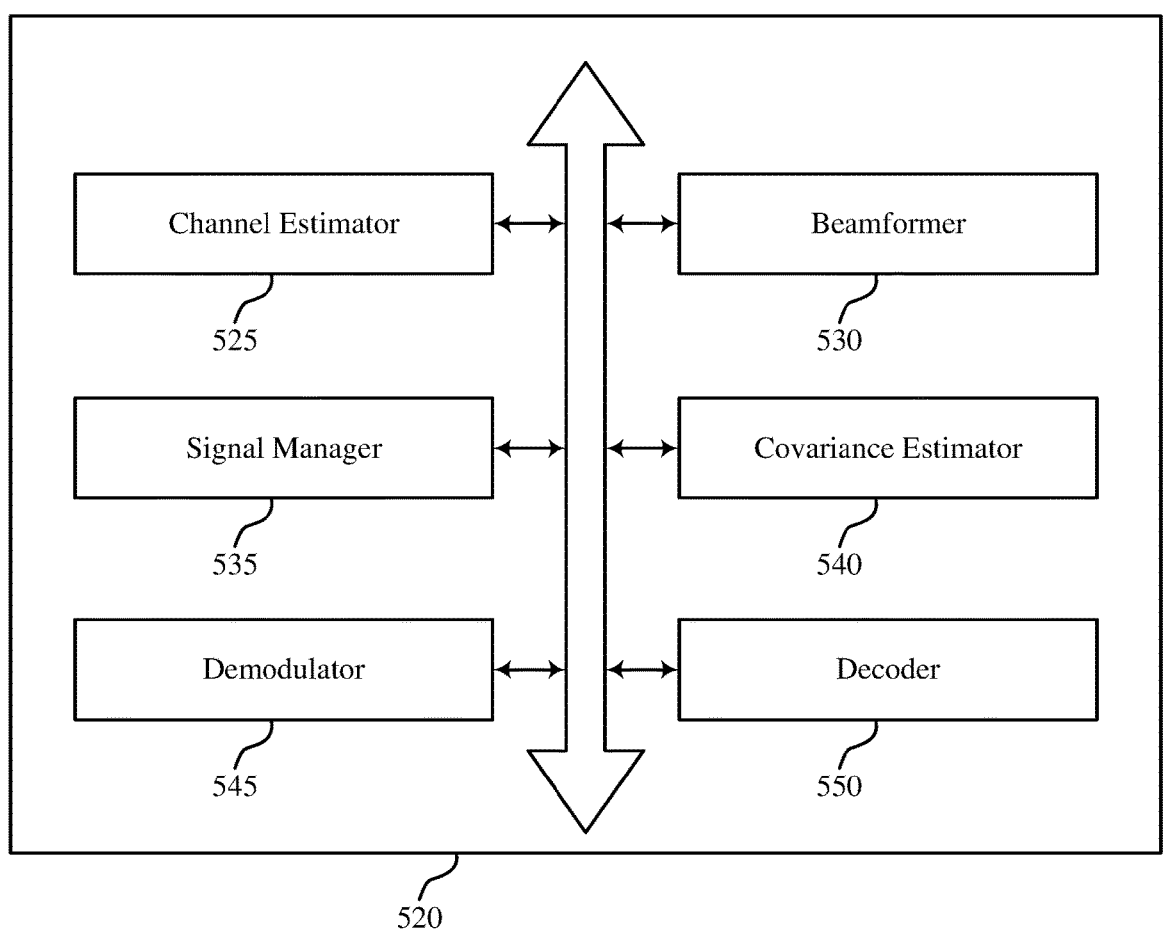

FIG. 5 shows a block diagram of a signal analyzer that supports lensing using lower earth orbit repeaters in accordance with examples as disclosed herein. The signal analyzer 520 may be an example of aspects of a first satellite or a ground station as described with reference to FIG. 1A. The signal analyzer 520, or various components thereof, may be an example of means for performing various aspects of lensing using lower earth orbit repeaters as described herein. For example, the signal analyzer 520 may include a channel estimator 525, a beamformer 530, a signal manager 535, a covariance estimator 540, a demodulator 545, a decoder 550, or any combination thereof. Each of these components may communicate, directly or indirectly, with one another (e.g., via one or more buses).

The signal analyzer 520 may support communications in accordance with examples as disclosed herein. The beamformer 530 may be configured as or otherwise support a means for obtaining beam coefficients of a beam associated with a geographic area based at least in part on an estimated return channel that comprises a first channel component between the geographic area and a plurality of second satellites and a second channel component between the plurality of second satellites and a first satellite; and forming a beam associated with the geographic area to obtain a beam signal based at least in part on the beam coefficients and a plurality of signal components of a signal originating from the geographic area and relayed by the plurality of second satellite to the first satellite.

In some examples, the channel estimator 525 may be configured as or otherwise support a means for estimating a return channel from a geographic area, the return channel comprising a first channel component between a first satellite and a plurality of second satellites and a second channel component between the plurality of second satellites and the geographic area. In some examples, to support estimating the return channel of the geographic area, the channel estimator 525 may be configured as or otherwise support a means for determining a plurality of return channels based at least in part on one or more other signals received from known geographic locations. In some examples, the one or more other signals comprise one or more reference signals transmitted by transmitters in the known geographic locations. In some examples, to support estimating the return channel of the geographic area, the channel estimator 525 may be configured as or otherwise support a means for interpolating characteristics of the plurality of return channels to estimate characteristics of the return channel.

In some examples, the signal manager 535 may be configured as or otherwise support a means for obtaining a representation of the plurality of signal components relayed by the plurality of second satellites and a representation of a direct signal component of the signal received at the first satellite from the geographic area, wherein the beam signal is determined based at least in part on the representation of the plurality of signal components and the representation of the direct signal component.

In some examples, the covariance estimator 540 may be configured as or otherwise support a means for estimating a return covariance associated with the geographic area based at least in part on the return channel. In some examples, the beamformer 530 may be configured as or otherwise support a means for determining beam coefficients of the beam based at least in part on the return channel and the return covariance.

In some examples, to support obtaining the beam signal, the beamformer 530 may be configured as or otherwise support a means for applying beam coefficients of the beam to a representation of the plurality of signal components of the signal to obtain one or more beam signals.

In some examples, the channel estimator 525 may be configured as or otherwise support a means for estimating a plurality of return channels from a plurality of geographic areas, the plurality of return channels comprising the return channel and the plurality of geographic areas comprising the geographic area. In some examples, the covariance estimator 540 may be configured as or otherwise support a means for estimating a return covariance based at least in part on the plurality of return channels. In some examples, the beamformer 530 may be configured as or otherwise support a means for determining a plurality of beam coefficients of a plurality of beams based at least in part on the plurality of return channels and the return covariance.

In some examples, the beamformer 530 may be configured as or otherwise support a means for applying the plurality of beam coefficients of the plurality of beams to representations of pluralities of signal components associated with a plurality of signals originating from the plurality of geographic areas to obtain one or more beam signals, the one or more beam signals comprising the beam signal.

In some examples, the demodulator 545 may be configured as or otherwise support a means for demodulating the beam signal. In some examples, the decoder 550 may be configured as or otherwise support a means for decoding a demodulated beam signal.

Figure 6:
FIG. 6 shows a diagram of a communications device that supports lensing using lower earth orbit repeaters in accordance with examples as disclosed herein.

FIG. 6 shows a diagram of a communications device that supports lensing using lower earth orbit repeaters in accordance with examples as disclosed herein. The communications device 605 may be an example of or include the components of a first satellite 105 (e.g., a geosynchronous satellite that support on-board beamforming) or ground system 130 as described herein. The communications device 605 may include components for processing signals, such as an input/output (I/O) controller 610, a transceiver 615, an antenna 625, a signal analyzer 620, a memory 630, code 635, and a processor 640. These components may be in electronic communication or otherwise coupled (e.g., operatively, communicatively, functionally, electronically, electrically) via one or more buses (e.g., a bus 645).

The I/O controller 610 may manage input and output signals for the communications device 605. The I/O controller 610 may also manage peripherals not integrated into the communications device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. Additionally, or alternatively, the I/O controller 610 may represent or interact with a modem, a keyboard, a mouse, a touchscreen, or a similar device. In some cases, the I/O controller 610 may be implemented as part of a processor, such as the processor 640. In some cases, a user may interact with the communications device 605 via the I/O controller 610 or via hardware components controlled by the I/O controller 610.

In some cases, antenna 625 may be a single antenna. In some other cases, the antenna 625 may include multiple antennas (or antenna elements), which may be capable of concurrently transmitting or receiving multiple wireless transmissions. The transceiver 615 may communicate bi-directionally, via the one or more antennas 625, wired, or wireless links as described herein. For example, the transceiver 615 may represent a wireless transceiver and may communicate bi-directionally with another wireless transceiver. The transceiver 615 may also include a modem to modulate the packets, to provide the modulated packets to one or more antennas 625 for transmission, and to demodulate packets received from the one or more antennas 625.

The memory 630 may include random-access memory (RAM) and read-only memory (ROM). The memory 630 may store code 635. Code 635 may be computer-readable and computer-executable code and may include instructions that, when executed by the processor 640, cause the communications device 605 to perform various functions described herein. The code 635 may be stored in a non-transitory computer-readable medium such as system memory or another type of memory. In some cases, the code 635 may not be directly executable by the processor 640 but may cause a computer (e.g., when compiled and executed) to perform functions described herein. In some cases, the memory 630 may contain, among other things, a basic input/output system (BIOS) which may control basic hardware or software operation such as the interaction with peripheral components or devices.

The processor 640 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 640 may be configured to operate a memory array using a memory controller. In some other cases, a memory controller may be integrated into the processor 640. The processor 640 may be configured to execute computer-readable instructions stored in a memory (e.g., the memory 630) to cause the communications device 605 to perform various functions (e.g., functions or tasks supporting reporting angular offsets across a frequency range). For example, the communications device 605 or a component of the communications device 605 may include a processor 640 and memory 630 coupled to the processor 640, the processor 640 and memory 630 configured to perform various functions described herein. Processor 640 may include (or be an example of) ground station processor 153 or on-board processor 187.

The signal analyzer 620 may support signal analysis at a first satellite (e.g., a geosynchronous satellite) or ground station in accordance with examples as disclosed herein. For example, the signal analyzer 620 may be configured as or otherwise support a means for obtaining beam coefficients of a beam associated with a geographic area based at least in part on an estimated return channel that comprises a first channel component between the geographic area and a plurality of second satellites and a second channel component between the plurality of second satellites and a first satellite. The signal analyzer 620 may be configured as or otherwise support a means for forming a beam associated with the geographic area to obtain a beam signal based at least in part on the beam coefficients and a plurality of signal components of a signal originating from the geographic area and relayed by the plurality of second satellite to the first satellite.

In some examples, the signal analyzer 620 may be configured to perform various operations (e.g., receiving, monitoring, transmitting) using or otherwise in cooperation with the transceiver 615, the one or more antennas 625, or any combination thereof. Although the signal analyzer 620 is illustrated as a separate component, in some examples, one or more functions described with reference to the signal analyzer 620 may be supported by or performed by the processor 640, the memory 630, the code 635, or any combination thereof. For example, the code 635 may include instructions executable by the processor 640 to cause the communications device 605 to perform various aspects of reporting angular offsets across a frequency range as described herein, or the processor 640 and the memory 630 may be otherwise configured to perform or support such operations.

FIG. 7 shows a flowchart illustrating a method that supports lensing using lower earth orbit repeaters in accordance with examples as disclosed herein. The operations of the method may be implemented by components of a first satellite (e.g., a geosynchronous satellite that support on-board beamforming) or ground station as described herein. In some examples, a first satellite or ground station may execute a set of instructions to control the functional elements of the first satellite or ground station to perform the described functions. Additionally, or alternatively, the first satellite or ground station may perform aspects of the described functions using special-purpose hardware.

At 705, the method may include obtaining beam coefficients of a beam associated with a geographic area based at least in part on an estimated return channel that comprises a first channel component between the geographic area and a plurality of second satellites and a second channel component between the plurality of second satellites and a first satellite. The operations of 705 may be performed in accordance with examples as disclosed herein. In some examples, aspects of the operations of 705 may be performed by a channel estimator 525 as described with reference to FIG. 5.

At 710, the method may include forming a beam associated with the geographic area to obtain a beam signal based at least in part on the beam coefficients and a plurality of signal components of a signal originating from the geographic area and relayed by the plurality of second satellite to the first satellite. The operations of 710 may be performed in accordance with examples as disclosed herein. In some examples, aspects of the operations of 710 may be performed by a beamformer 530 as described with reference to FIG. 5.

In some examples, an apparatus as described herein may perform a method or methods, such as the method 700. The apparatus may include, features, circuitry, logic, means, or instructions (e.g., a non-transitory computer-readable medium storing instructions executable by a processor) for obtaining beam coefficients of a beam associated with a geographic area based at least in part on an estimated return channel that comprises channel components between the geographic area and a plurality of second satellites; and forming a beam associated with the geographic area to obtain a beam signal based at least in part on the beam coefficients and a plurality of signal components associated with a signal originating from the geographic area.

Some examples of the method 700 and the apparatus described herein may further include operations, features, means, or instructions for receiving a representation of the plurality of signal components, wherein the beam signal is obtained based at least in part on applying the beam coefficients of the beam to the representation of the plurality of signal components.

Some examples of the method 700 and the apparatus described herein may further include operations, features, means, or instructions for estimating a return channel from a geographic area, the return channel comprising a first channel component between a first satellite and a plurality of second satellites and a second channel component between the plurality of second satellites and the geographic area.

In some examples of the method 700 and the apparatus described herein, estimating the return channel of the geographic area may include operations, features, circuitry, logic, means, or instructions for determining a plurality of return channels based at least in part on one or more other signals received from known geographic locations and interpolating characteristics of the plurality of return channels to estimate characteristics of the return channel.

In some examples of the method 700 and the apparatus described herein, the one or more other signals comprise one or more reference signals transmitted by transmitters in the known geographic locations.

Some examples of the method 700 and the apparatus described herein may further include operations, features, means, or instructions for obtaining a representation of the plurality of signal components relayed by the plurality of second satellites and a representation of a direct signal component of the signal received at the first satellite from the geographic area, wherein the beam signal may be determined based at least in part on the representation of the plurality of signal components and the representation of the direct signal component.

Some examples of the method 700 and the apparatus described herein may further include operations, features, means, or instructions for estimating a return covariance associated with the geographic area based at least in part on the return channel and determining beam coefficients of the beam based at least in part on the return channel and the return covariance.

In some examples of the method 700 and the apparatus described herein, obtaining the beam signal may include operations, features, circuitry, logic, means, or instructions for applying beam coefficients of the beam to a representation of the plurality of signal components of the signal to obtain one or more beam signals.

Some examples of the method 700 and the apparatus described herein may further include operations, features, means, or instructions for estimating a plurality of return channels from a plurality of geographic areas, the plurality of return channels comprising the return channel and the plurality of geographic areas comprising the geographic area, estimating a return covariance based at least in part on the plurality of return channels, and determining a plurality of beam coefficients of a plurality of beams based at least in part on the plurality of return channels and the return covariance.

Some examples of the method 700 and the apparatus described herein may further include operations, features, means, or instructions for applying the plurality of beam coefficients of the plurality of beams to representations of pluralities of signal components associated with a plurality of signals originating from the plurality of geographic areas to obtain one or more beam signals, the one or more beam signals comprising the beam signal.

A system for communications is described. The system may include a first satellite in a first orbit, a plurality of second satellites in second orbits that are lower than the first orbit, wherein the plurality of second satellites are configured to detect respective signal components of a signal originating from a geographic area and to relay the respective signal components to the first satellite, and a beamformer configured to form a beam associated with the geographic area to obtain a beam signal based at least in part on the respective signal components and an estimated return channel, wherein the estimated return channel comprises channel components between the geographic area and the plurality of second satellites.

In some examples of the system, the first satellite comprises a plurality of transponders, wherein to transmit a representation of the signal to a ground system, each transponder of the plurality of transponders may be configured to receive the respective signal components relayed by the plurality of second satellites and to transmit a representation of the respective signal components to the ground system.

In some examples of the system, each satellite of the plurality of second satellites comprises at least one repeater, wherein to relay the respective signal components to the first satellite, repeaters of the plurality of second satellites may be configured to amplify the respective detected signal components and transmit respective amplified signal components to the first satellite. In some examples of the system, the at least one repeater may be a non-processing repeater.

In some examples of the system, the repeaters of the plurality of second satellites may be configured to transmit the respective amplified signal components at a same frequency as the respective signal components detected at the repeaters.

In some examples of the system, the repeaters of the plurality of second satellites may be configured to transmit the respective amplified signal components at a different frequency than the respective signal components detected at the repeaters.

In some examples of the system, each of the repeaters of the plurality of second satellites may be configured to transmit a respective amplified signal component at a respective frequency of a plurality of frequencies.

In some examples of the system, the respective signal components detected by the plurality of second satellites may be detected via a first channel between the plurality of second satellites and the geographic area, the respective signal components may be relayed to the first satellite via a second channel between the plurality of second satellites and the first satellite, and the first satellite may be configured to transmit a representation of the respective signal components to a ground system via a third channel between the first satellite and the ground system.

In some examples of the system, the beamformer may be further configured to estimate a return covariance associated with the estimated return channel, determine beam coefficients of the beam based at least in part on the estimated return channel and the return covariance, and apply the beam coefficients to the respective signal components to obtain the beam signal.

In some examples, the system may include a ground system comprising, a plurality of gateways configured to receive a representation of the respective signal components, and the beamformer, wherein the beamformer may be coupled with the plurality of gateways and configured to apply beam coefficients of the beam to the representation of the respective signal components to obtain the beam signal.

In some examples of the system, the first satellite comprises the beamformer and may be further configured to transmit the beam signal to a ground system.

In some examples of the system, the plurality of second satellites may be configured to detect a plurality of respective signal components of a plurality of signals originating from a plurality of geographic areas, the plurality of signals comprising the signal and the plurality of geographic areas comprising the geographic area and the beamformer may be configured to form a plurality of beams associated with the plurality of geographic areas to obtain a plurality of beam signals based at least in part on the plurality of respective signal components and a plurality of estimated return channels, the plurality of estimated return channels comprising the estimated return channel.

In some examples of the system, the beamformer may be further configured to estimate a return covariance associated with the plurality of geographic areas and determine beam coefficients of the beam based at least in part on the estimated return channel and the return covariance and to apply the beam coefficients of the beam to the plurality of respective signal components to obtain the plurality of beam signals.

In some examples of the system, the first satellite may be configured to detect a direct signal component of the signal.

In some examples of the system, the beamformer may be further configured to obtain the beam signal based at least in part on the direct signal component.

In some examples of the system, the beamformer may be further configured to estimate the estimated return channel based at least in part on other signals received from one or more other geographic areas. In some examples of the system, the other signals comprise one or more reference signals transmitted by transmitters in known locations.

In some examples of the system, the plurality of second satellites comprises a first set of satellites in a first orbital plane of the second orbits. In some examples of the system, the plurality of second satellites comprises a second set of satellites in a second orbital plane of the second orbits.

In some examples, the system includes a processor configured to demodulate the beam signal. In some examples, the system includes a processor that comprises the beamformer. In some examples of the system, the first orbit may be a geostationary orbit.

A communications device is described. The communications device may include a processor, memory coupled with the processor and comprising instructions executable by the processor to cause the communications device to, estimate a return channel from a geographic area, the return channel comprising a first channel component between a first satellite and a plurality of second satellites and a second channel component between the plurality of second satellites and the geographic area, and obtain, based at least in part on a plurality of signal components associated with a signal originating from the geographic area, a beam signal, wherein the plurality of signal components are relayed by respective second satellites of the plurality of second satellites.

In some examples of the communications device, the instructions for estimating the return channel may be further executable by the processor to determine a plurality of return channels based at least in part on one or more other signals received from known geographic locations and interpolate characteristics of the plurality of return channels to estimate characteristics of the return channel.

In some examples of the communications device, the instructions may be further executable by the processor to obtain a representation of the plurality of signal components relayed by the plurality of second satellites and a representation of a direct signal component of the signal received at the first satellite from the geographic area, wherein the beam signal may be determined based at least in part on the representation of the plurality of signal components and the representation of the direct signal component.

In some examples of the communications device, the instructions may be further executable by the processor to estimate a return covariance associated with the geographic area based at least in part on the return channel and determine beam coefficients of the beam based at least in part on the return channel and the return covariance.

In some examples of the communications device, the instructions for obtaining the beam signal may be further executable by the processor to apply beam coefficients of the beam to a representation of the plurality of signal components of the signal to obtain one or more beam signals.

In some examples of the communications device, the instructions may be further executable by the processor to estimate a plurality of return channels from a plurality of geographic areas, the plurality of return channels comprising the return channel and the plurality of geographic areas comprising the geographic area, estimate a return covariance based at least in part on the plurality of return channels, and determine a plurality of beam coefficients of a plurality of beams based at least in part on the plurality of return channels and the return covariance.

In some examples of the communications device, the instructions may be further executable by the processor to apply the plurality of beam coefficients of the plurality of beams to representations of pluralities of signal components associated with a plurality of signals originating from the plurality of geographic areas to obtain one or more beam signals, the one or more beam signals comprising the beam signal.

It should be noted that these methods describe examples of implementations, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a digital signal processor (DSP) and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable read-only memory (EEPROM), flash memory, compact disk read-only memory (CDROM) or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A system for communications, comprising:
   a first satellite in a first orbit;
   a plurality of second satellites in second orbits that are lower than the first orbit, wherein the plurality of second satellites are configured to detect respective signal components of a first signal originating from a single emitter in a geographic area and to relay the respective signal components to the first satellite, wherein the respective signal components detected by the plurality of second satellites are detected via a first channel between the plurality of second satellites and the geographic area, and wherein the respective signal components are relayed to the first satellite via a second channel between the plurality of second satellites and the first satellite; and
   a beamformer configured to form a beam associated with the geographic area to obtain a beam signal based at least in part on a coherent combination of the respective signal components and an estimated return channel, wherein the estimated return channel comprises channel components between the geographic area and the plurality of second satellites.

2. The system of claim 1, wherein the first satellite comprises:
   a plurality of transponders, wherein to transmit a representation of the first signal to a ground system, each transponder of the plurality of transponders is configured to receive the respective signal components relayed by the plurality of second satellites and to transmit a representation of the respective signal components to the ground system.

3. The system of claim 1, wherein each satellite of the plurality of second satellites comprises:
   at least one repeater, wherein to relay the respective signal components to the first satellite, repeaters of the plurality of second satellites are configured to amplify the respective signal components and transmit respective amplified signal components to the first satellite.

4. The system of claim 3, wherein the at least one repeater is a non-processing repeater.

5. The system of claim 3, wherein the repeaters of the plurality of second satellites are configured to transmit the respective amplified signal components at a same frequency as the respective signal components detected at the repeaters.

6. The system of claim 3, wherein the repeaters of the plurality of second satellites are configured to transmit the respective amplified signal components at a different frequency than the respective signal components detected at the repeaters.

7. The system of claim 3, wherein each of the repeaters of the plurality of second satellites are configured to transmit a respective amplified signal component at a respective frequency of a plurality of frequencies.

8. The system of claim 1, wherein:
the first satellite is configured to transmit a representation of the respective signal components to a ground system via a third channel between the first satellite and the ground system.

9. The system of claim 1, wherein the beamformer is further configured to:
estimate a return covariance associated with the estimated return channel;
determine beam coefficients of the beam based at least in part on the estimated return channel and the return covariance; and
apply the beam coefficients to the respective signal components to obtain the beam signal.

10. The system of claim 1, further comprising:
a ground system comprising:
at least one gateway configured to receive a representation of the respective signal components; and
the beamformer, wherein the beamformer is coupled with the at least one gateway and configured to apply beam coefficients of the beam to the representation of the respective signal components to obtain the beam signal.

11. The system of claim 1, wherein the first satellite comprises the beamformer.

12. The system of claim 1, wherein the first satellite is configured to transmit the beam signal to a ground system.

13. The system of claim 1, wherein:
the plurality of second satellites is configured to detect a plurality of respective signal components of a plurality of signals originating from a plurality of geographic areas, the plurality of signals comprising the first signal and the plurality of geographic areas comprising the geographic area; and
the beamformer is configured to form a plurality of beams associated with the plurality of geographic areas to obtain a plurality of beam signals based at least in part on the plurality of respective signal components and a plurality of estimated return channels, the plurality of beams comprising the beam, the plurality of beam signals comprising the beam signal, and the plurality of estimated return channels comprising the estimated return channel.

14. The system of claim 13, wherein the beamformer is further configured to:
estimate a return covariance associated with the plurality of geographic areas; and
determine beam coefficients of the beam based at least in part on the estimated return channel and the return covariance and to apply the beam coefficients to the plurality of respective signal components to obtain the plurality of beam signals.

15. The system of claim 1, wherein the first satellite is configured to detect a direct signal component of the first signal.

16. The system of claim 15, wherein the beamformer is further configured to:
obtain the beam signal based at least in part on the direct signal component.

17. The system of claim 1, wherein the beamformer is further configured to:
estimate the estimated return channel based at least in part on other signals received from one or more other geographic areas.

18. The system of claim 17, wherein the other signals comprise one or more reference signals transmitted by transmitters in known locations.

19. The system of claim 1, wherein the plurality of second satellites comprises:
a first set of satellites in a first orbital plane of the second orbits.

20. The system of claim 19, wherein the plurality of second satellites further comprises:
a second set of satellites in a second orbital plane of the second orbits.

21. The system of claim 1, further comprising:
a processor configured to demodulate the beam signal.

22. The system of claim 1, further comprising:
a processor that comprises the beamformer.

23. The system of claim 1, wherein the first orbit is a geostationary orbit.

* * * * *